United States Patent
Sen et al.

(10) Patent No.: US 9,326,097 B2
(45) Date of Patent: Apr. 26, 2016

(54) SURROUNDING ESTIMATION BASED ON SENSORS OF A MOBILE DEVICE

(71) Applicant: Seven Networks, LLC, Marshall, TX (US)

(72) Inventors: Sudipta Sen, Richardson, TX (US); Tejas Jukar, Fremont, CA (US); Vivek Agarwal, Foster City, CA (US); Subhakar Reddy Chedulla, Sunnyvale, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

(21) Appl. No.: 14/329,950

(22) Filed: Jul. 13, 2014

(65) Prior Publication Data

US 2016/0014554 A1    Jan. 14, 2016

(51) Int. Cl.
*H04W 24/00* (2009.01)
*H04W 4/02* (2009.01)
*H04W 88/06* (2009.01)
*H04W 84/12* (2009.01)

(52) U.S. Cl.
CPC ............... *H04W 4/02* (2013.01); *H04W 4/027* (2013.01); *H04W 4/028* (2013.01); *H04W 84/12* (2013.01); *H04W 88/06* (2013.01)

(58) Field of Classification Search
CPC ....... H04W 4/04; H04W 4/043; H04W 24/02; H04W 40/20; H04W 52/0254; H04W 52/0258; H04W 4/027; H04W 4/028; H04W 4/06; H04W 4/12; H04W 88/06; H04W 84/12
USPC .......... 455/404.1, 414.1, 456.1, 456.2, 456.3, 455/456.5, 405
See application file for complete search history.

(56) References Cited

U.S. PATENT DOCUMENTS

| | | | |
|---|---|---|---|
| 2008/0165115 A1* | 7/2008 | Herz et al. ..................... | 345/102 |
| 2010/0007638 A1 | 1/2010 | Knowles | |
| 2010/0253504 A1* | 10/2010 | Lliteras et al. ........... | 340/539.11 |
| 2011/0032148 A1 | 2/2011 | Peeters et al. | |
| 2012/0170425 A1 | 7/2012 | Matsuzaki | |
| 2012/0252495 A1 | 10/2012 | Moeglein et al. | |
| 2013/0170419 A1 | 7/2013 | Bakthavathsalu et al. | |
| 2014/0210852 A1* | 7/2014 | Peng et al. ..................... | 345/619 |
| 2014/0309924 A1* | 10/2014 | Varoglu et al. ................ | 701/410 |
| 2014/0331166 A1* | 11/2014 | Li ................................. | 715/772 |

OTHER PUBLICATIONS

Form PCT/ISA/210 dated Oct. 22, 20125 for PCT Application No. PCT/US2015/040080.

* cited by examiner

*Primary Examiner* — Jean Gelin
(74) *Attorney, Agent, or Firm* — NK Patent Law, PLLC

(57) ABSTRACT

Techniques are disclosed for estimating a surrounding in which a mobile device is situated based on sensors of the mobile device. The sensors can be typical sensors currently existing on mobile devices and not dedicated for surrounding detection purposes. One embodiment includes a method which comprises retrieving a weather condition from a remote server; deriving, based on the weather condition, a plurality of weights for sensors on the mobile device; applying each weight to an output of a corresponding sensor on the mobile device; and determining whether the mobile device is likely to be indoor or outdoor based on one or more weighted outputs from the sensors. Among other advantages, embodiments disclosed herein increased accuracy to estimate the mobile device's surrounding without the need of dedicated sensors or other modification to mobile network infrastructures, thereby providing the benefit of surrounding sensing without incurring the cost.

20 Claims, 14 Drawing Sheets

SURROUNDING ESTIMATION BASED ON SENSORS OF A MOBILE DEVICE

BACKGROUND

Because mobile devices such as smartphones or tablet computers often operate on limited amount of battery power, it is desirable to detect a surrounding in which the mobile devices are situated. The information regarding the mobile devices' surrounding can help service operators (e.g., a telephone service company, a third-party company, or other suitable entities) and software applications analyze as well as enhance the effectiveness of their behaviors.

Conventional approaches rely on dedicated devices to assist with surrounding detection. However, the deployment cost of such infrastructure-based approaches significantly limits the flexibility and scalability for general purpose detection.

SUMMARY

According to one or more embodiments, a method for sensing a surrounding of a mobile device is provided. The method includes requesting a weather condition that is received from a remote server, deriving, based on the weather condition, a plurality of weights for sensors on the mobile device, applying each weight to an output of a corresponding sensor on the mobile device, and determining whether the mobile device is likely to be indoor or outdoor based on one or more weighted outputs from the sensors.

According to one or more embodiments, determining whether the mobile device is indoor or outdoor is based on more than one weighted outputs from the sensors.

According to one or more embodiments, the method includes detecting whether the mobile device is in motion and adjusting a timing for determining whether the mobile device is indoor or outdoor based on whether a location change of the mobile device exceeds a threshold.

According to one or more embodiments, detecting whether the mobile device is in motion includes using an accelerometer to detect if a user of the mobile device has traveled a predetermined number of steps within a given time period.

According to one or more embodiments, the method includes, if the user of the mobile device has traveled a predetermined number of steps within a given time period, using a global positioning satellite (GPS) receiver to determine how many satellites' signals can be received by the GPS receiver, and determining that the mobile device is likely to be indoor if a number of satellites with receivable signals is below a threshold.

According to one or more embodiments, detecting whether the mobile device is in motion includes using wireless network circuitry on the mobile device to estimate the mobile device is changing location.

According to one or more embodiments, the wireless network circuitry comprises a wireless telephony circuit and a wireless local area network (WLAN) circuit.

According to one or more embodiments, the sensors includes a light sensor, and the method includes statistically calculating a background light intensity from the light sensor. The statistical calculating is based on the plurality of weights derived based on the weather condition determining that the mobile device is likely to be indoor if the background light intensity is below a first number and determining that the mobile device is likely to be outdoor if the background light intensity is above a second number.

According to one or more embodiments, the sensors include a temperature sensor, and determining whether the mobile device is likely to be indoor or outdoor further includes statistically calculating a background temperature from the temperature sensor, where the statistical calculating is based on the plurality of weights derived based on the weather condition and determining that the mobile device is likely to be indoor if the background temperature is above a first number and determining that the mobile device is likely to be outdoor if the background temperature is below a second number.

According to one or more embodiments, the sensors include a proximity sensor, the method includes using the proximity sensor to detect whether the mobile device is in condition: (a) a pocket of a user or (b) in close proximity to the user's body so as to affect the outputs from the sensors, and, if the mobile device is in (a) or (b) condition, excluding outputs from a light sensor and a temperature sensor from the determining process.

According to one or more embodiments, the sensors include a wireless local area network (WLAN) circuit, and determining further includes measuring a received signal strength indication (RSSI) number using the WLAN circuit, determining that the mobile device is likely to be indoor if the RSSI number is above a first number, and determining that the mobile device is likely to be outdoor if the RSSI number is below a second number.

According to one or more embodiments, the sensors comprise a battery status sensor to retrieve a charging state of a battery of the mobile device, and the method further includes adjusting the plurality of weights based on the charging state.

According to one or more embodiments, adjusting of the plurality of weights includes decreasing a background temperature as being statistically calculated from a temperature sensor so as to compensate for a temperature increase caused by the mobile device's battery being charged or discharged.

According to one or more embodiments, a mobile device that senses its surrounding is provided. The mobile device includes a processor and a memory coupled to the processor and storing instructions thereon which, when executed by the processor, cause the processor to perform steps including requesting a weather condition that is received from a remote server, deriving, based on the weather condition, a plurality of weights for sensors on the mobile device, applying each weight to an output of a corresponding sensor on the mobile device, and determining whether the mobile device is likely to be indoor or outdoor based on one or more weighted outputs from the sensors.

BRIEF DESCRIPTION OF THE DRAWINGS

The present embodiments are illustrated by way of example and are not intended to be limited by the figures of the accompanying drawings. In the drawings:

FIG. 1I depicts an example diagram illustrating data flows between example client side components in a distributed proxy and cache system;

The same reference numbers and any acronyms identify elements or acts with the same or similar structure or functionality throughout the drawings and specification for ease of understanding and convenience.

DETAILED DESCRIPTION

Figure 1A:
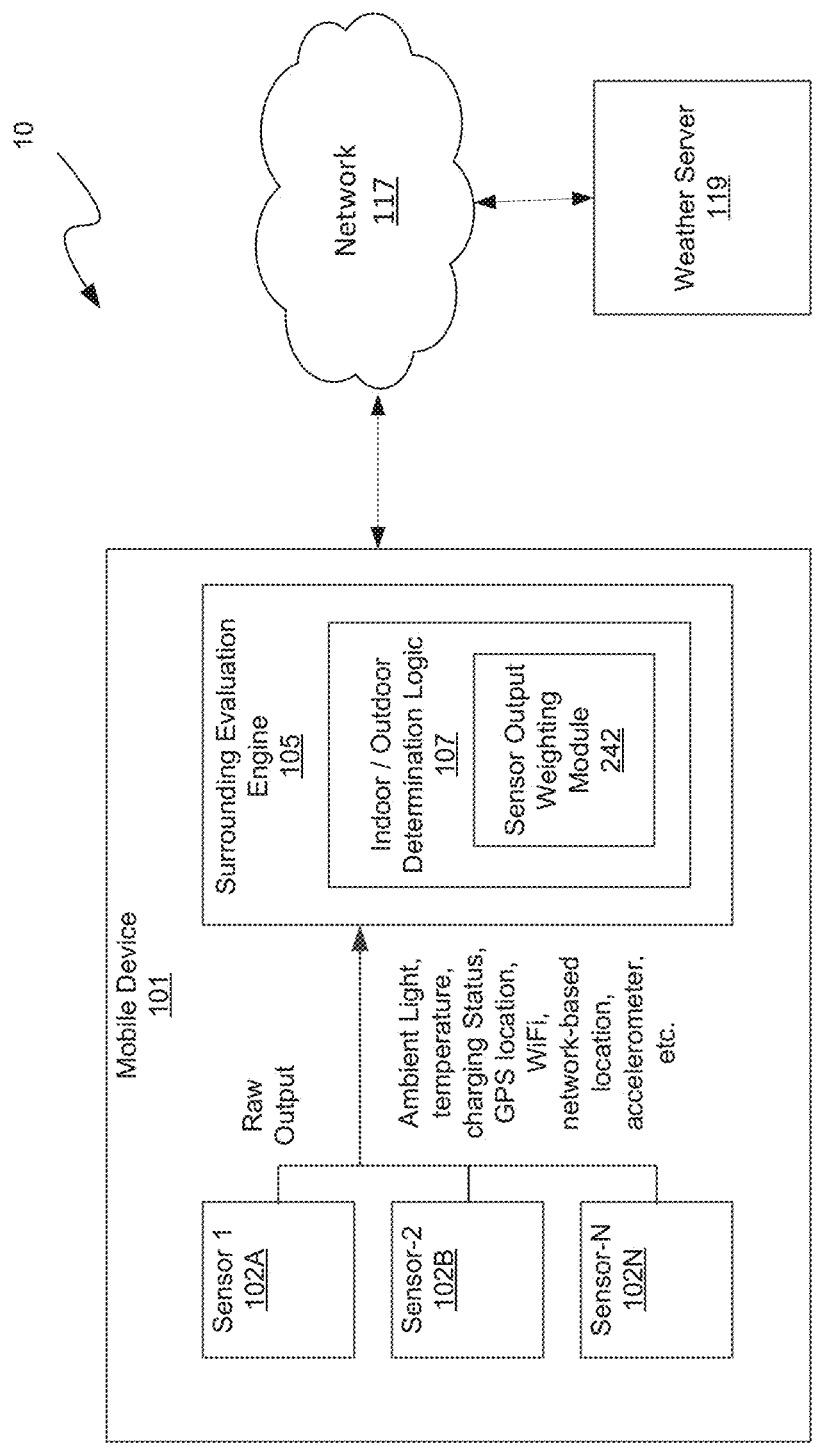
FIG. 1A depicts a diagram illustrating example resources, including a surrounding evaluation engine and one or more sensors, that implement the surrounding estimation (e.g., whether the mobile device is likely to be indoor or outdoor) techniques disclosed herein.

Techniques are disclosed for estimating a surrounding in which a mobile device is situated based on sensors of the mobile device. The sensors can be typical sensors currently existing on mobile devices and not dedicated for surrounding detection purposes. One embodiment includes a method which comprises retrieving a weather condition from a remote server; and deriving, based on the weather condition, a plurality of weights for sensors on the mobile device. The method further comprises applying each weight to an output of a corresponding sensor on the mobile device; and determining whether the mobile device is likely to be indoor or outdoor based on one or more weighted outputs from the sensors.

Among other advantages, embodiments disclosed herein increase accuracy to estimate the mobile device's surrounding (e.g., whether indoor or outdoor) without the need of dedicated sensors or other modification to mobile network infrastructures, thereby providing the benefit of surrounding sensing without incurring the cost.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1A depicts a diagram 10 illustrating example resources that implement the surrounding evaluation techniques disclosed herein. Included in the diagram 10 are a mobile device 101, a weather server 119 (e.g., which can be hosted by a proxy server of a distributed proxy system, or can be hosted by a third-party), and a communications network 117.

The mobile device 101 and server 119 are coupled in communication for data transmission over the network 117. For example, the components may be connected via a twisted pair cabling network, a coax cable network, a telephonic network, or any suitable type of connection network. In some embodiments, the network 117 may be wireless. The technologies supporting the communications between the mobile device 101 and server 119 may include Ethernet and/or other suitable types of area network technologies. One of ordinary skill in the art will understand that the components of FIG. 1 are just one implementation of the computer network environment within which present embodiments may be implemented, and the various alternative embodiments are within the scope of the present disclosure. For example, the network 117 may include intervening devices (e.g., switches, routers, hubs, etc.) in the network 117. In some examples, the network 117 comprises the Internet. Depending on the embodiments, mobile device 101 can be connected directly to the server 119, or via the network 117, or both.

The weather server 119 may be one or more server computers or work stations that are employed for hosting websites that provide weather information services, such as weather forecast, current weather, and/or historical weather, for given geographical locations. The server 119 typically includes at least one processor and a memory, and may be further connected to one or more computers (not shown in FIG. 1 for simplicity) that provide other weather-related functions via the network 117. The mobile device 101, which may be used by a customer user to communicate with the server 117 in performing the surrounding estimation (e.g., through the techniques disclosed herein), may include a laptop, a tablet, a personal computer, a personal digital assistant ("PDA"), a smart phone, and the like. As said, in some examples, the server 119 may be a host server that facilitates management of traffic, content caching, and/or resource conservation (e.g., the host server 100, described in FIGS. 1B-1I below) or another server that is separate from the host server 100. Depending on the embodiments, this separate server may be a portion of the host server 100, or it may be hosted by a third party (e.g., the weather server 119).

The mobile device 101 typically includes a display (not shown in FIG. 1 for simplicity), and may include suitable input devices (not shown for simplicity) such as a keyboard, a mouse, or a touchpad. In some embodiments, the display may be a touch-sensitive screen that includes input functionalities.

Sensors 102 (e.g., sensors 102A-102N) are example sensors equipped on the mobile device 101. Sensors 102 can provide typical or legacy sensing functionalities that are not dedicated to identify in which surrounding the mobile device 101 is located, such as light intensity, room temperature, a charging status of a battery on the mobile device 101, global positioning satellite (GPS) signals, accelerometer, gyroscope, and so forth. Sensors 102 can also include hardware on the mobile device that is not primarily sensory in function, such as wireless communication circuitry, including wireless telephony circuits (e.g., GPRS, 3G, HSPA+, or LTE) and wireless local area network (WLAN (e.g., WiFi)) circuits. As used throughout the present disclosure, the term "dedicated sensor(s)" refers to a sensor system dedicated to recognize which surrounding the mobile device 101 is in; for example, the dedicated sensor system may require a companion sensor or an identifier that is not located within the mobile device so as to identify a surrounding.

As previously mentioned, it is recognized in the present disclosure that, although the conventional dedicated sensor(s) can fairly accurately recognize the surrounding, they increase the cost to the mobile device (e.g., by adding an additional hardware sensor on the device) as well as to the infrastructure (e.g., by installing those companion sensors or identifiers).

Accordingly, the mobile device 101 includes a surrounding evaluation engine 177 which can determine/detect the surrounding in which the mobile device 101 is situated based on sensors on the mobile device 101. An example of the surrounding detection is whether the mobile device 101 is indoor or outdoor. The sensors used for the disclosed techniques can be typical sensors on the mobile device 101, which do not require additional infrastructure. Also, because the disclosed techniques can be based on existing sensors on the mobile device 101, the surrounding detection can be performed at the application layer and does not require an administrative privilege (e.g., root, admin, or OEM integration) to operate; that is to say, an application implementing the disclosed techniques can be easily installed by an end user, thereby reducing the time and effort to deploy such application.

More specifically, some embodiments of the surrounding evaluation engine 105 include an indoor/outdoor determination logic 107, which can include a sensor output weighting module 242. The surrounding evaluation engine 105 can receive the weather reports from the weather server 119. The surrounding evaluation engine 105 also has pre-evaluated sensor profiles, which record how outputs from different sensors as present on the mobile device 101 should be adjusted or weighted under various weather conditions in determining the mobile device 101's physical surrounding. The sensor profiles can be mobile device and/or sensor specific. Based on the weather information and the pre-evaluated sensor profiles, the surrounding evaluation engine 105 can use the output from various sensors for gathering defined weightages, which are aggregated by the indoor/outdoor determination logic 107 to generate the best estimation of whether the mobile device 101 is indoor or outdoor.

In one implementation, the surrounding evaluation engine 105 retrieves a weather condition from the weather server 119. Then, the sensor output weighting module 242 derives a plurality of weights for sensors 102 on the mobile device 101 based on the weather condition, and applies each weight to an output of a corresponding sensor on the mobile device 101. Thereafter, the indoor/outdoor determination logic 107 determines whether the mobile device 101 is likely to be indoor or outdoor based on one or more weighted outputs from the sensors 102.

In some variations, the surrounding evaluation engine 105 detects whether the mobile device is in motion, and the surrounding detection is only performed upon or after a location change of the mobile device 101. Among others, this can increase the possibility that the detection generates meaningful results and avoid undesirable power drain. These and various other embodiments and implementations of the disclosed surrounding evaluation techniques are described in more details below.

Figure 1B:
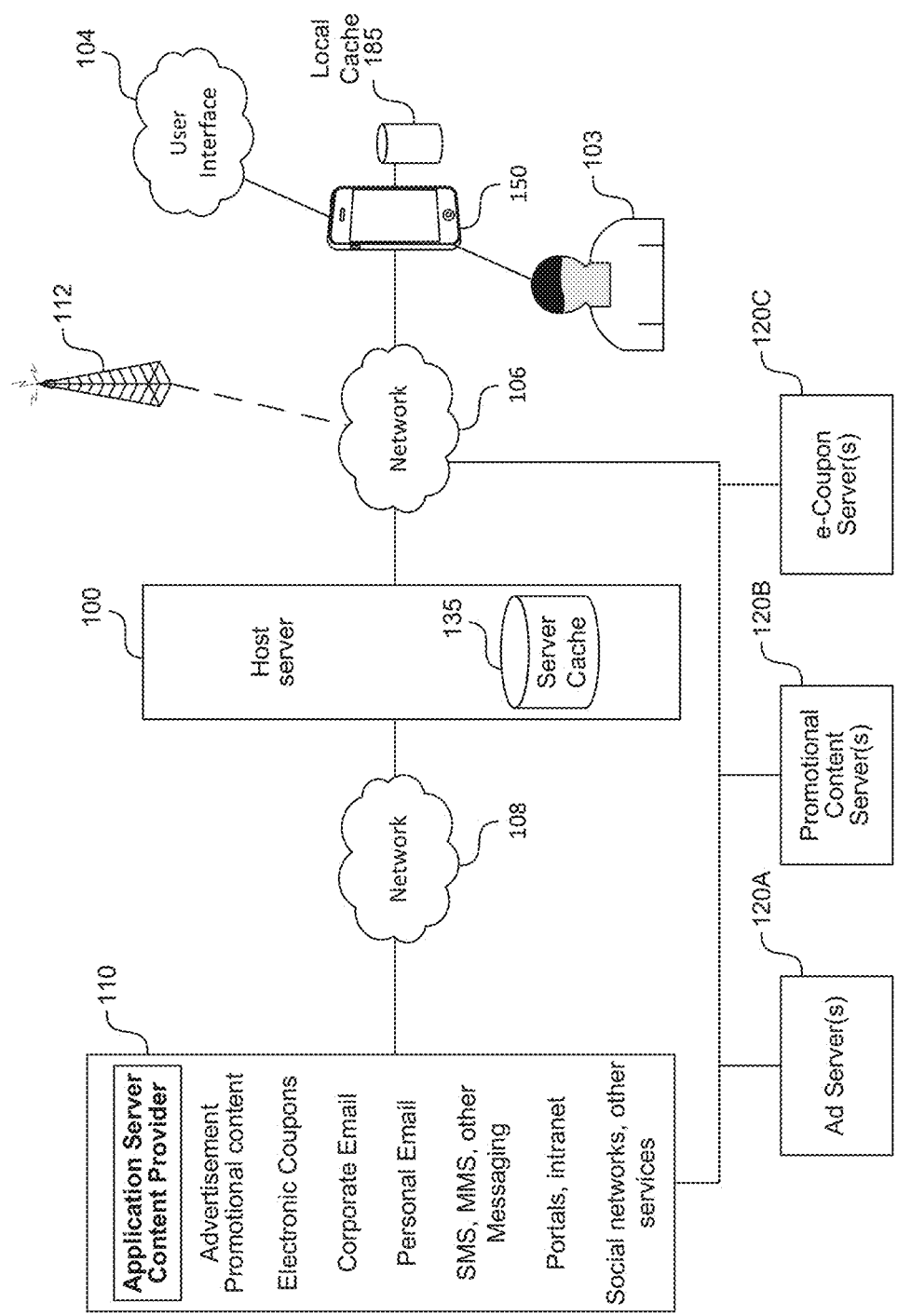
FIG. 1B depicts an example diagram of a system where a host server facilitates management of traffic, content caching, and/or resource conservation, which can based on and benefit from the surrounding information estimated from the disclosed techniques.

FIG. 1B illustrates an example diagram of a system where a host server 100 facilitates management of traffic, content caching, and/or resource conservation and/or surrounding evaluation between mobile devices (e.g., wireless devices 150), and an application server or content provider 110, or other servers such as an ad server 120A, promotional content server 120B, or an e-coupon server 120C in a wireless network (or broadband network) for resource conservation. The host server 100 can further interact with mobile or client devices 150 for getting reports and/or updates on resource usage, savings, and the like.

The client devices 150 can be any system and/or device, and/or any combination of devices/systems that is able to establish a connection, including wired, wireless, cellular connections with another device, a server and/or other systems such as host server 100 and/or application server/content provider 110. Client devices 150 typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, a handheld tablet (e.g., an iPad or any other tablet), a hand held console, a hand held gaming device or console, any Super-Phone such as the iPhone, and/or any other portable, mobile, hand held devices, or fixed wireless interface such as a M2M device, etc. In one embodiment, the client devices 150, host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 150 through one or more of the above input mechanism, or others, can be used in the disclosed technology in acquiring context awareness at the client device 150. Context awareness at client devices 150 generally includes, by way of example but not limitation, client device 150 operation or state acknowledgement, management, user activity/ behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data and/or mobile application loading and/or activities. Network side contextual data can be received from and/or queried from network service providers (e.g., cell provider 112 and/or Internet service providers) of the network 106 and/or network 108 (e.g., by the host server and/or devices 150). In addition to application context awareness as determined from the client 150 side, the application context awareness may also be received from or obtained/ queried from the respective application/service providers 110 (by the host 100 and/or client devices 150).

The host server 100 can use, for example, contextual information obtained for client devices 150, networks 106/108, applications (e.g., mobile applications), application server/ provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/ application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation and/or surrounding evaluation are performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management and/or surrounding evaluation for resource conservation in networks (e.g., network 106 and/or 108) and devices 150, can reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Notably, in some embodiments of such systems, the host server 100 can include the server 111 (FIG. 1A), the application server 110 can include the third-party servers 119 (FIG. 1A), and/or the mobile device 150 can include the mobile device 101 (FIG. 1A).

In one embodiment, client devices 150 communicate with the host server 100 and/or the application server 110 over network 106, which can be a cellular network and/or a broadband network. To facilitate overall traffic management and/or surrounding evaluation between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
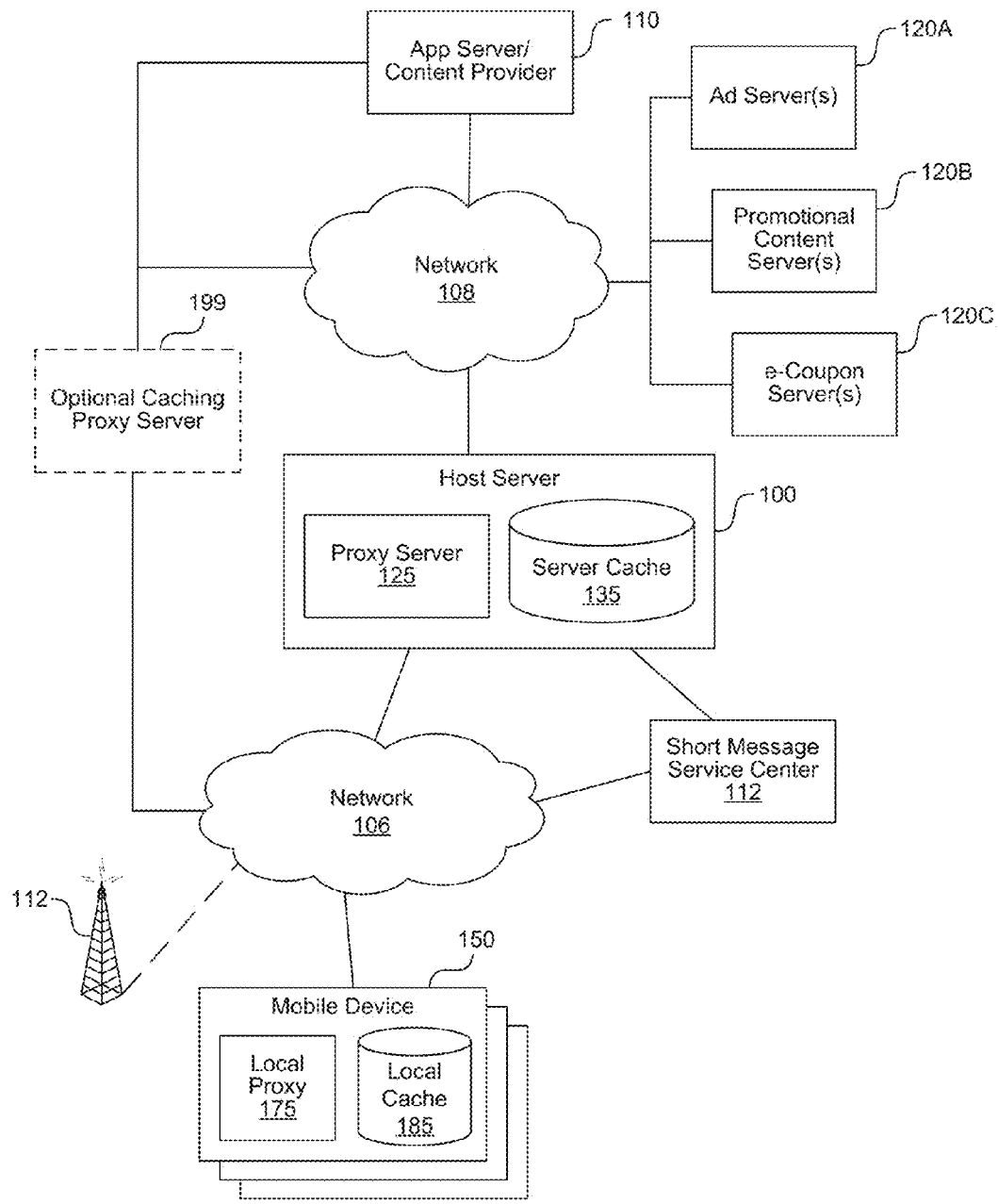
FIG. 1C depicts an example diagram of a proxy and cache system distributed between the host server and a device which implements the disclosed techniques.

FIG. 1C illustrates an example diagram of a proxy and cache system distributed between the host server 100 and device 150 which facilitates network traffic management and/or surrounding evaluation between the device 150 and an application server or content provider 110, or other servers such as an ad server 120A, promotional content server 120B, or an e-coupon server 120C for resource conservation and content caching The proxy system distributed among the host server 100 and the device 150 can further track alarms, timers or other triggers implemented by applications on a device and resources used by such alarms, timers, or other triggers to determine associations using which the proxy system can manipulate the alarms, timers or other triggers to occur at an optimal time to reduce resource usage.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1D:
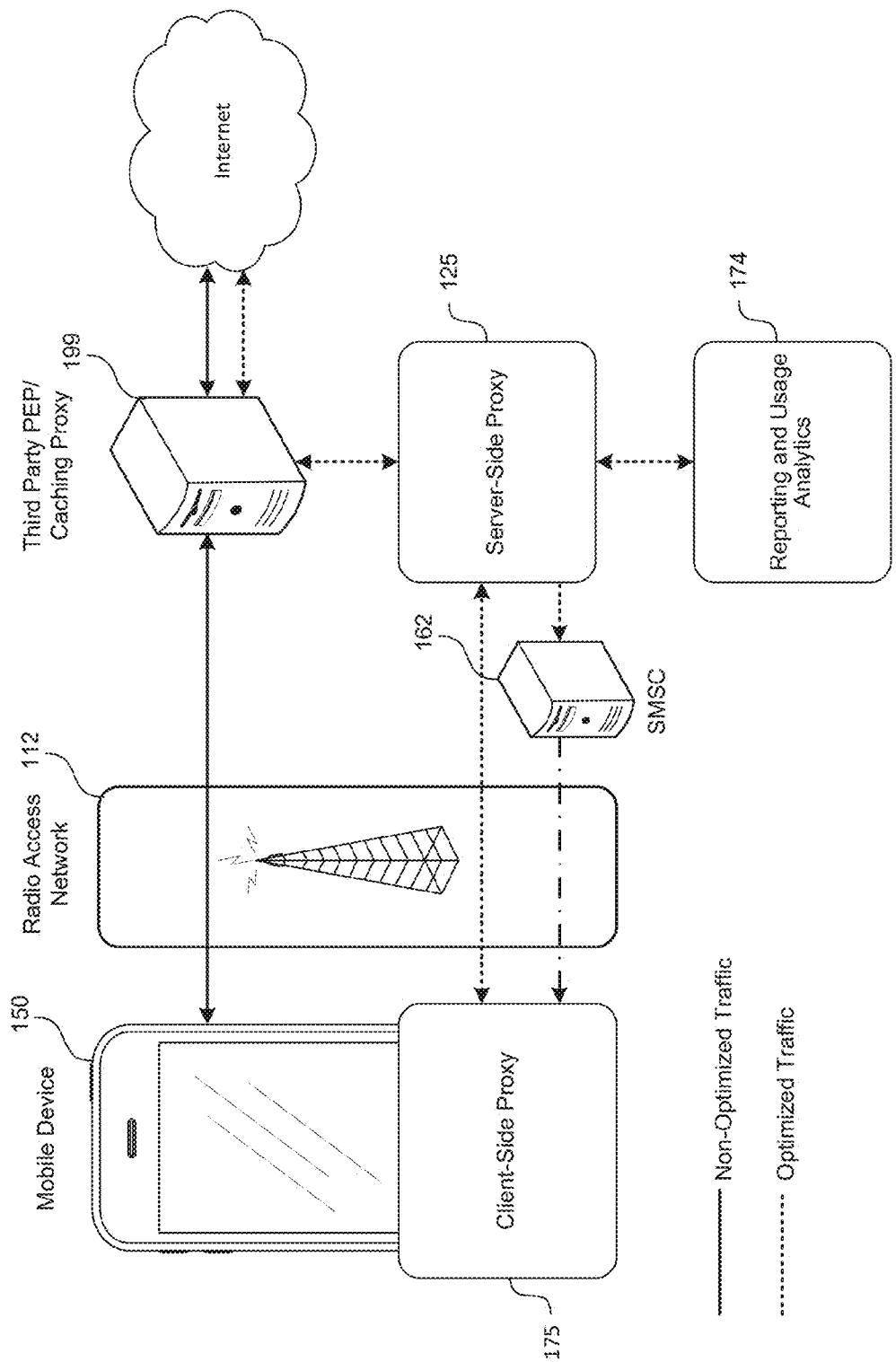
FIG. 1D depicts an example diagram of the logical architecture of a distributed proxy and cache system.

FIG. 1D illustrates an example diagram of the logical architecture of a distributed proxy and cache system.

The distributed system can include, for example the following components:

Client Side Proxy 175: a component installed in the Smartphone, mobile device or wireless device 150 that interfaces with device's operating system, as well as with data services and applications installed in the device. The client side proxy 175 is typically compliant with and able to operate with standard or state of the art networking protocols.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1E:
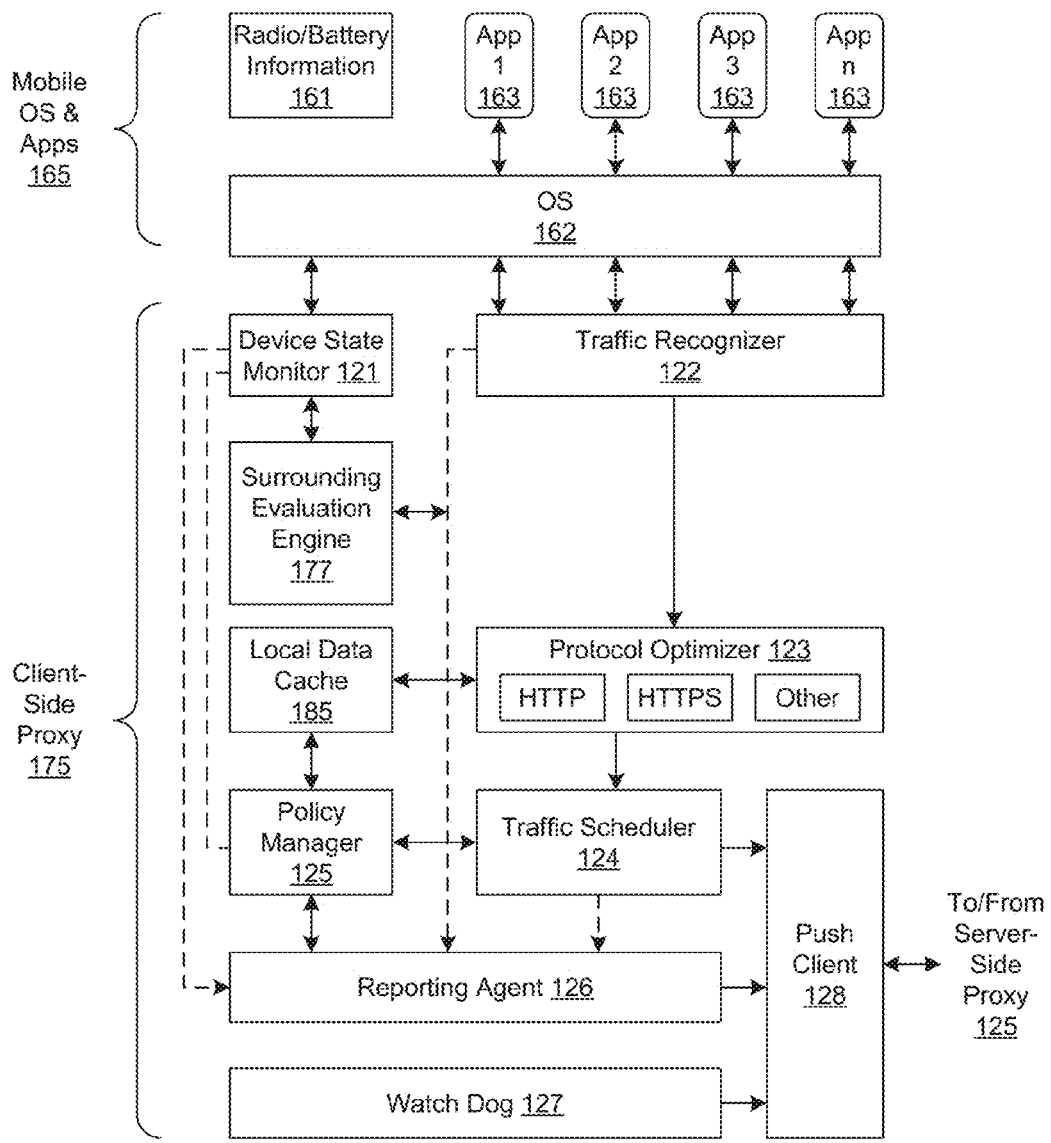
FIG. 1E depicts an example diagram showing the architecture of client side components in a distributed proxy and cache system, the client side including a surrounding estimation engine.

FIG. 1E illustrates an example diagram showing the architecture of client side components in a distributed proxy and cache system.

The client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device do not notice that the client side proxy 175 is responding to their requests. Some example components of the client side proxy 175 are described as follows:

Device State Monitor 121: The device state monitor 121 can be responsible for identifying several states and metrics in the device, such as network status, display status, battery level, etc. such that the remaining components in the client side proxy 175 can operate and make decisions according to device state, acting in an optimal way in each state.

Surrounding Evaluation Engine 177: Similar to what are mentioned with regard to FIG. 1A, the surrounding evaluation engine 177 can perform the surrounding evaluation (e.g., indoor/outdoor detection) techniques disclosed herein. In the embodiment shown in FIG. 1E, the surrounding evaluation engine 177 is coupled to the device state monitor 121 to receive application activity, battery, network status, as well as user selection, an administrator's selection, and/or other suitable information. The surrounding evaluation engine 177 can also receive readings from light sensors, temperature sensors, charging status sensors (e.g., aforementioned battery sensor), GPS sensors or receivers, WLAN antennas, accelerometer, etc., The surrounding evaluation engine 177 also received weather information in determining the weightings for the sensor readings in performing the mobile device surrounding evaluation. In some embodiments, the surrounding evaluation engine 177 can also communicate with the server-side proxy 125 (FIG. 1F) for reporting and statistical purposes.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a reporting server (e.g., the reporting and/or usage analytics system which may be internal to or external to the server side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1F:
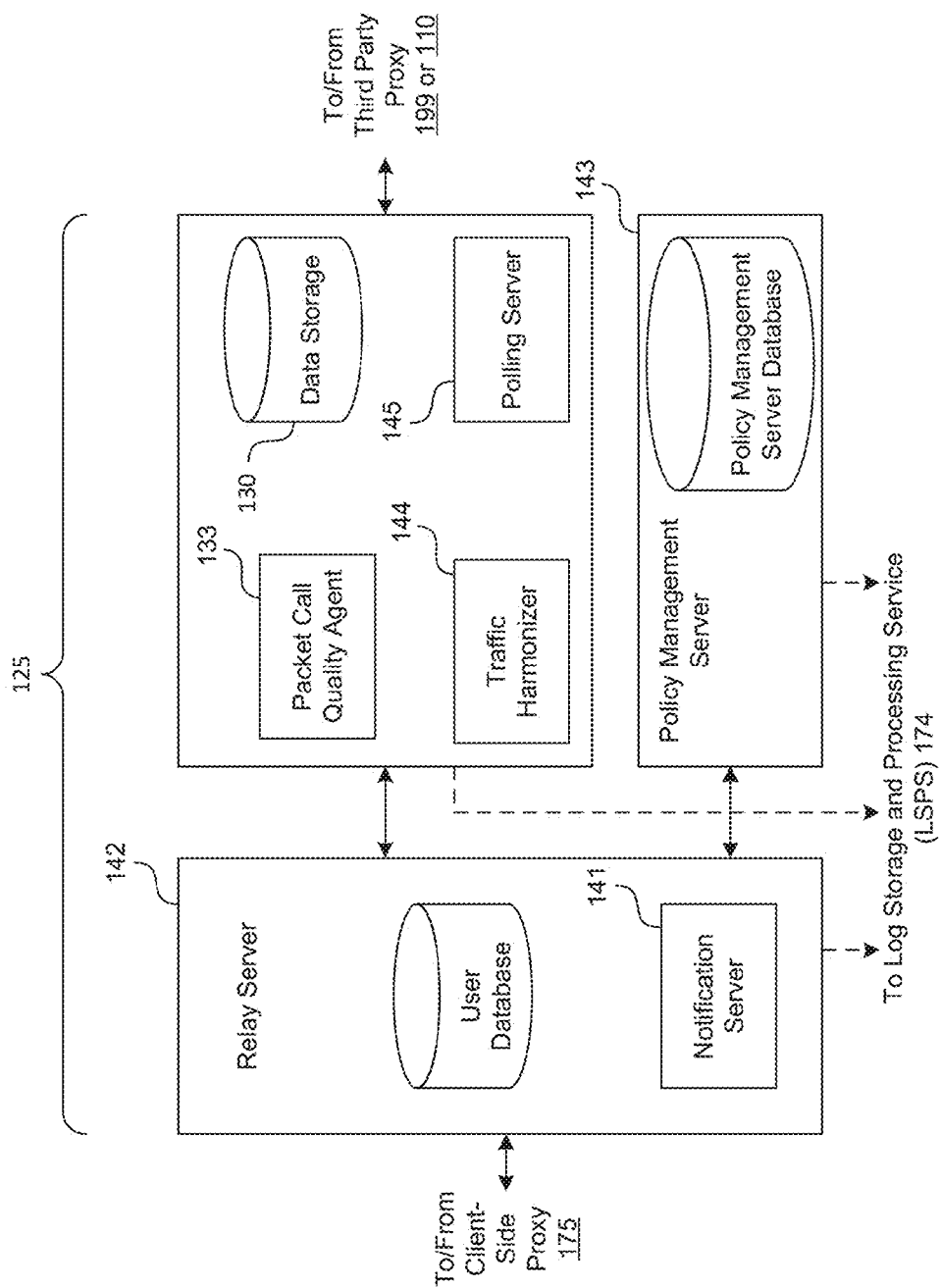
FIG. 1F depicts an example diagram of the example components on the server side of the distributed proxy and cache system.

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Most mobile applications regularly poll their application servers to check for new data. Often there is no new data or the content has not changed, so the exchange of data through the mobile network is unnecessary. As the number of mobile phones and their applications increase, the amount of this needless polling grows. Since applications are not coordinated and poll at different times and intervals, any given phone may frequently generate signal traffic. This causes multiple unnecessary radio activations, consuming power and shortening battery life.

In one embodiment, the signaling optimizer reduces network requests to a minimum by caching content in the client and letting its own server poll for changes in the network. When a mobile phone's client side proxy (e.g., local proxy) 175 detects a recurring pattern for a resource, such as an email application, its response content is stored locally in a client cache so similar requests from that application get their response from the local cache, rather than signaling the network.

In another embodiment, systems and methods of intelligent alarm tracker and resource manipulator can be used to reduce network requests by consolidating or changing the timing of requests such that use of resources including network, battery, CPU, memory and the like can be reduced.

In some embodiments, features of the signaling optimizer and the intelligent alarm tracker and resource manipulator may be used together to obtain reduce resource usage by mobile applications on a mobile device.

Figure 1G:
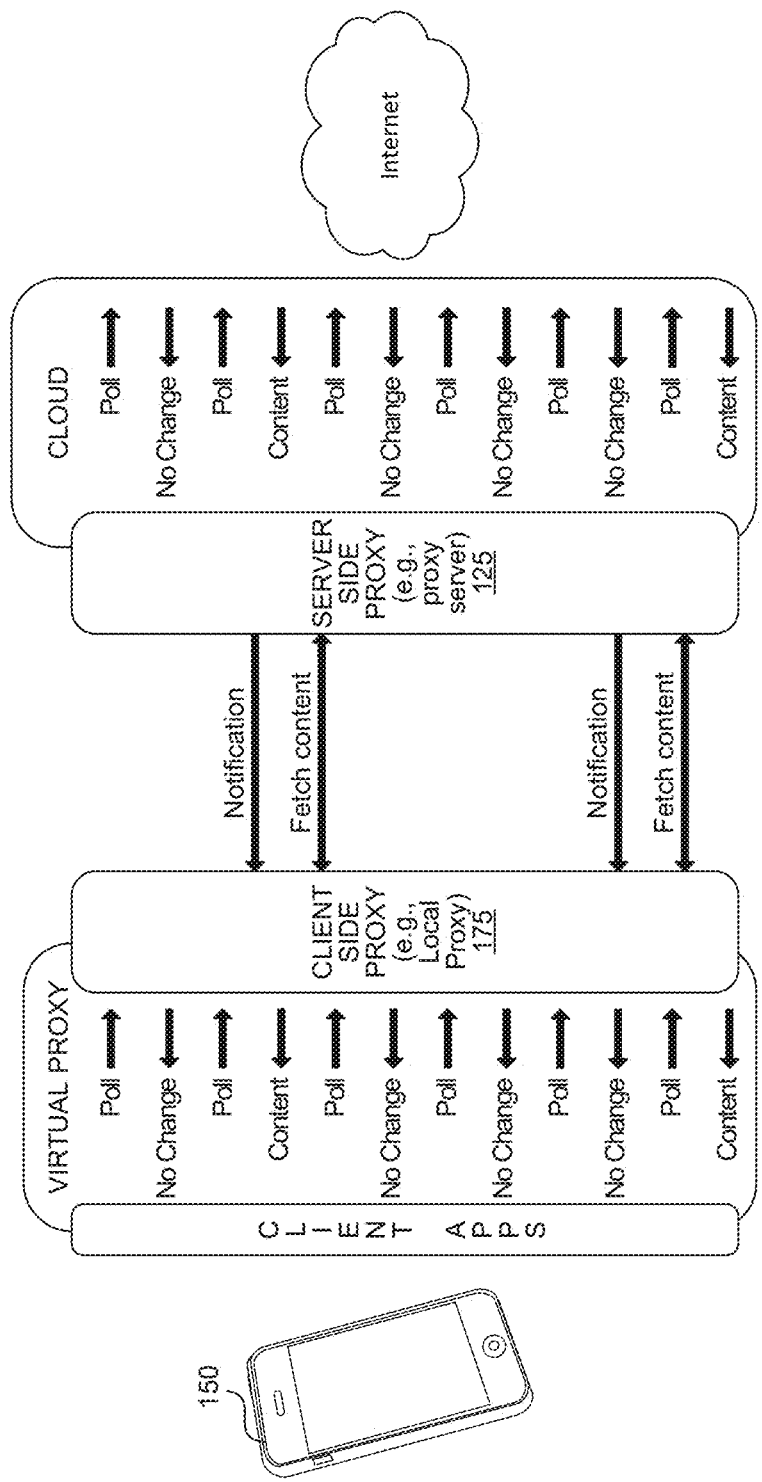
FIG. 1G depicts an example diagram of a signaling optimizer of the distributed proxy and cache system.

FIG. 1G illustrates an example diagram of a signaling optimizer of the distributed proxy and cache system.

As an example, someone who typically gets only 10 emails a day may have phone's email application poll the network for new email every 15 minutes, or 96 times a day, with around 90% or more of the polls resulting in the same response: there are no new emails. The client side proxy (e.g., local proxy) 175 can recognize this request—response pattern, and intercepts the application's poll requests, returning the locally cached response of "no new emails". This way the device radio is not turned on by this particular application, and the poll doesn't use any network resources. The server (e.g., host server 100, proxy server 125), located in the network, can monitor the email application server on behalf of the user's email application. When new email is available, the server can notify the user's client side proxy 175 to not use the cached "no new emails" response for the next poll request. Instead of going to the local client cache, the email application polls its application server over the network and receives the new content.

The signaling optimizer can be configured and managed using different rule sets for different device types, user types, wireless networks, and applications. Optimization rules can be updated at any time, so the changes can be applied immediately when an application upgrades or changes happen in the mobile network. The protocols that can be optimized include, but are not limited to: HTTP, HTTPS and DNS.

Figure 1H:
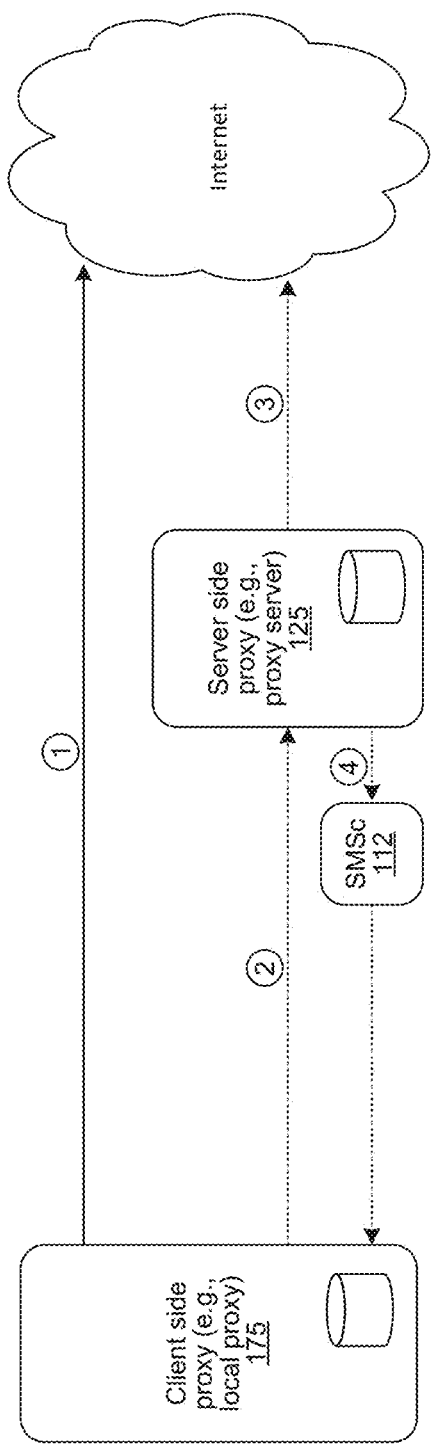
FIG. 1H depicts an example diagram of an example client-server architecture of the distributed proxy and cache system.
Figure 11:
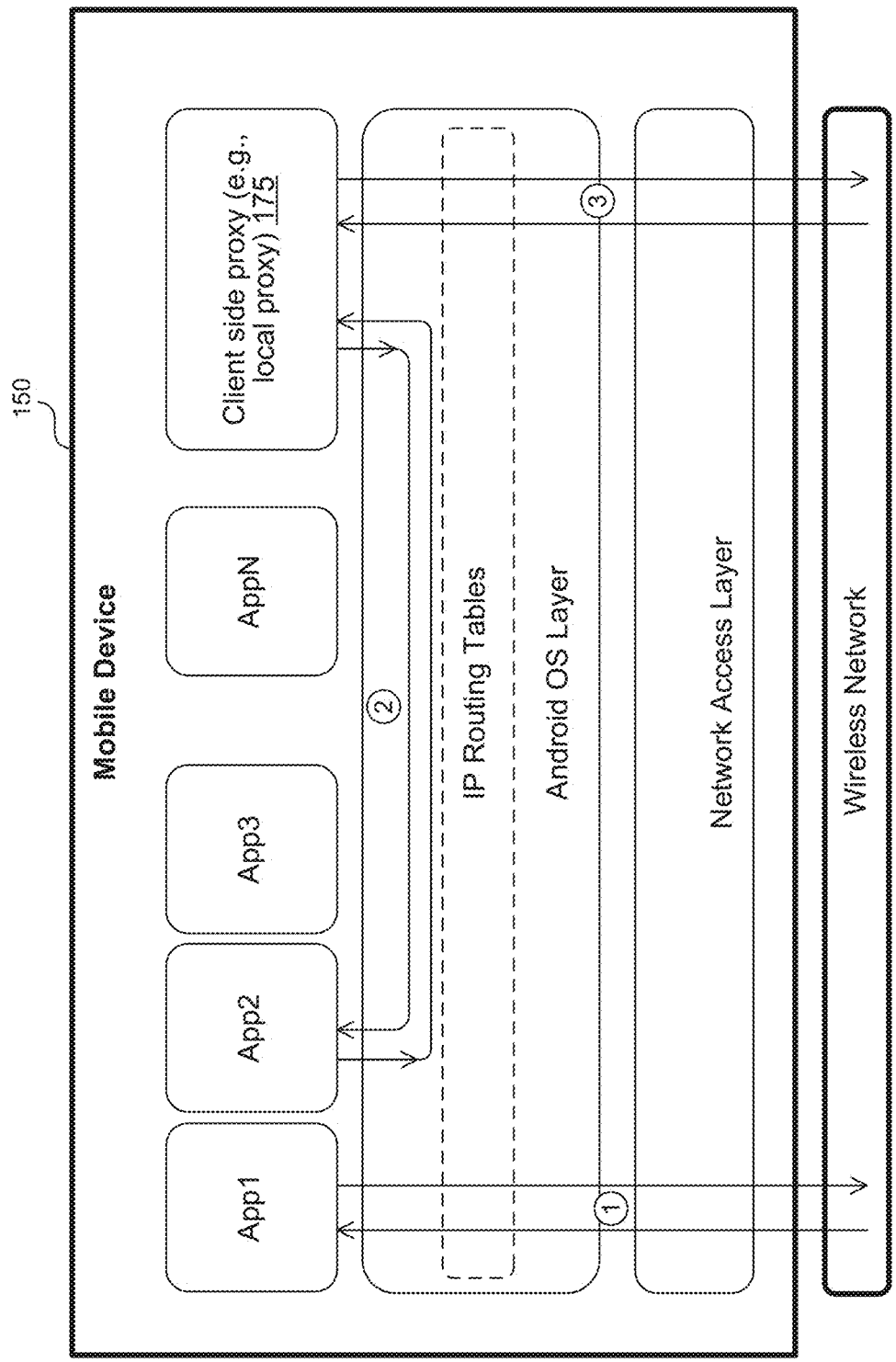

FIG. 1H illustrates an example diagram of an example client-server architecture of the distributed proxy and cache system.

In the client-server architecture, the client side proxy 175 (e.g., local proxy) is residing on the mobile or client devices. The client side proxy 175 can communicate both directly to the Internet (usually via an operator proxy) and to the server side proxy (e.g., proxy server) 125, or the host server 100. The proxy server 125 communicates to the Internet and to the operator's SMSC 112.

As depicted, the client side proxy 175 can send a request directly to the Internet. This can happen after requests have been analyzed to detect optimizable patterns, for example. The client side proxy 175 can, in one implementation, send a request to the server (e.g., host server 100, proxy server 125), for example, to initiate server polling, to reports logs or to get new configuration. The proxy server 125 can send a request to the Internet to, for example, validate cached content. In one implementation, the proxy server 125 can send a request to the SMSC 112, for example, to send a cache invalidate message or policy update message to the client-side proxy 175.

In one implementation, the client side proxy 175 may not maintain an open connection with the proxy server 125, but may connect to the proxy server 125 only in case there's a need to start polling an origin server 110, to report logs or to get new configuration. For signaling optimizer feature, the proxy server 125 can notify the client side proxy 175 when the content, that has been polled, has changed. The proxy server 125 can send a request to invalidate cache in the client side proxy 125. When the application connects to that particular origin server (e.g., content server 110) the next time, it can first fetch the latest content from the proxy server 125 and then directly connect to the origin server 110. For the policy enforcer and/or the network protector features, the proxy server 125 can notify the client side proxy 175 when there's new configuration to be fetched from the server. When the proxy server 125 needs to communicate with the client side proxy 175, it can use a connection that is already open for some other request. If the connection is not open, the proxy server 125 can send a notification (e.g., SMS) to the client side proxy 175.

FIG. 1I depicts an example diagram illustrating data flows between example client side components in a distributed proxy and cache system. Traffic from applications (e.g., App1, App2, App3 to AppN), client side proxy (e.g., local proxy) 175, IP Routing Tables (e.g., in the Android Operating System Layer), Network Access Layer and Wireless Network are depicted.

In one implementation, non-optimized application traffic flow, such as traffic from App1, can completely bypass the client side proxy 175 components and proceed directly through the operating system layer (e.g., the Android OS layer) and Network Access Layer to the wireless network. Traffic that that is not optimized can include, but is not limited to: rich media, like video and audio, as well as traffic from networks and applications that has been configured to bypass optimization and traffic pending optimization, and the like. In one embodiment, all traffic can be configured to bypass the client side/server side proxy.

In another implementation, optimized application traffic, such as traffic from App2, can be redirected from the application to the client side proxy 175. By default, this can be traffic on ports 80 (HTTP) and 53 (DNS), and selected traffic on port 443 (HTTPS), for example. However, traffic to other ports can be configured to be directed to the client side proxy.

In yet another implementation, traffic flow can be between the client side proxy 175 and the origin servers (e.g., content server 110) via the Internet and/or between the client side proxy 175 and the server side proxy (e.g., proxy server) 125.

Figure 2:
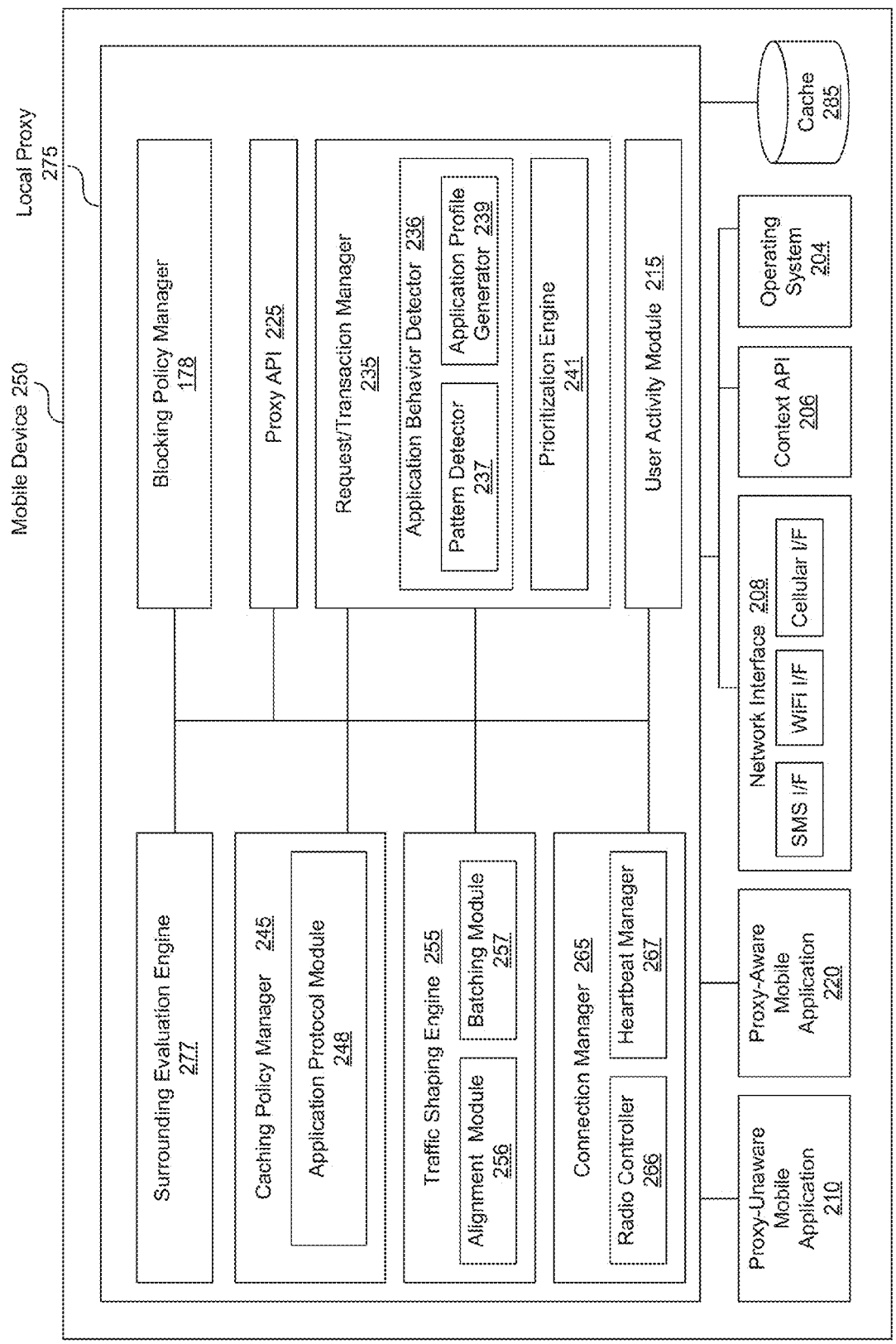
FIG. 2 depicts example functional components of a mobile device implementing a surrounding estimation engine.

FIG. 2 depicts a block diagram illustrating an example of client-side components in a distributed proxy and cache system residing on a device 250 that manages traffic in a wireless network for resource conservation, content caching, traffic management, and/or surrounding estimation. The client-side proxy (or local proxy 275) can further categorize mobile traffic and/or implement delivery policies based on application behavior, content priority, user activity, and/or user expectations.

The device 250, which can be a portable or mobile device (e.g., any wireless device), such as a portable phone, generally includes, for example, a network interface 208 an operating system 204, a context API 206, and mobile applications which may be proxy-unaware 210 or proxy-aware 220. Note that the device 250 is specifically illustrated in the example of FIG. 2 as a mobile device, such is not a limitation and that device 250 may be any wireless, broadband, portable/mobile or non-portable device able to receive, transmit signals to satisfy data requests over a network including wired or wireless networks (e.g., WiFi, cellular, Bluetooth, LAN, WAN, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, WiFi interface, interfaces for various generations of mobile communication standards including but not limited to 2G, 3G, 3.5G, 4G, LTE, etc.,), Bluetooth, or whether or not the connection is via a router, an access point, a wireless router, a switch, a multilayer switch, a protocol converter, a gateway, a bridge, a bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245 having an application protocol module 248, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. Additional or less components/modules/engines can be included in the local proxy 275 and each illustrated component.

As used herein, a "module," "a manager," a "handler," a "detector," an "interface," a "controller," a "normalizer," a "generator," an "invalidator," or an "engine" includes a general purpose, dedicated or shared processor and, typically, firmware or software modules that are executed by the processor. Depending upon implementation-specific or other considerations, the module, manager, handler, detector, interface, controller, normalizer, generator, invalidator, or engine can be centralized or its functionality distributed. The module, manager, handler, detector, interface, controller, normalizer, generator, invalidator, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, games, productivity tools, or other applications, etc.

The proxy 275 is generally application independent and can be used by applications (e.g., both proxy-aware and proxy-unaware applications 210 and 220 or mobile applications) to open TCP connections to a remote server. In some instances, the local proxy 275 includes a proxy API 225 which can be optionally used to interface with proxy-aware applications 220 (or applications (e.g., mobile applications) on a mobile device (e.g., any wireless device)).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client/application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the user activity module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the request/transaction manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook-related transactions to have a higher priority than LinkedIn-related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual synchronization request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | New email in deleted items | Low |
| Read more | High | | |
| Download attachment | High | Delete an email | Low |
| | | (Un)Read an email | Low |
| New Calendar event | High | Move messages | Low |
| Edit/change Calendar event | High | Any calendar change | High |
| | | Any contact change | High |
| Add a contact | High | Wipe/lock device | High |
| Edit a contact | High | Settings change | High |
| Search contacts | High | Any folder change | High |
| Change a setting | High | Connector restart | High (if no changes nothing is sent) |
| Manual send/receive | High | | |
| IM status change | Medium | Social Network Status Updates | Medium |
| Auction outbid or change notification | High | Severe Weather Alerts | High |
| Weather Updates | Low | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform-specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110) that would result from the application requests that would be performed at the mobile device or wireless device 250 to be performed instead, by a proxy server remote from the device 250. Traffic shaping engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular or other wireless broadband) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed and/or new data has been received, the remote entity to which polling is offloaded, can notify the device 250.

In one embodiment, the local proxy 275 can mitigate the need/use of periodic keep-alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend.

The surrounding evaluation engine 277 can perform the surrounding evaluation (e.g., indoor/outdoor detection) techniques disclosed herein. The surrounding evaluation engine 277 can receive application activity, battery, network status, as well as user selection, an administrator's selection, and/or other suitable information. The surrounding evaluation engine 277 can also receive readings from light sensors, temperature sensors, charging status sensors (e.g., aforementioned battery sensor), GPS sensors or receivers, WLAN antennas, accelerometer, etc., The surrounding evaluation engine 277 also received weather information in determining the weightings for the sensor readings in performing the mobile device surrounding evaluation. In some embodiments, the results from surrounding evaluation engine 177 can assist, for example, the traffic shaping engine 255 or the request/transaction manager 235, in performing their functionalities.

Figure 3:
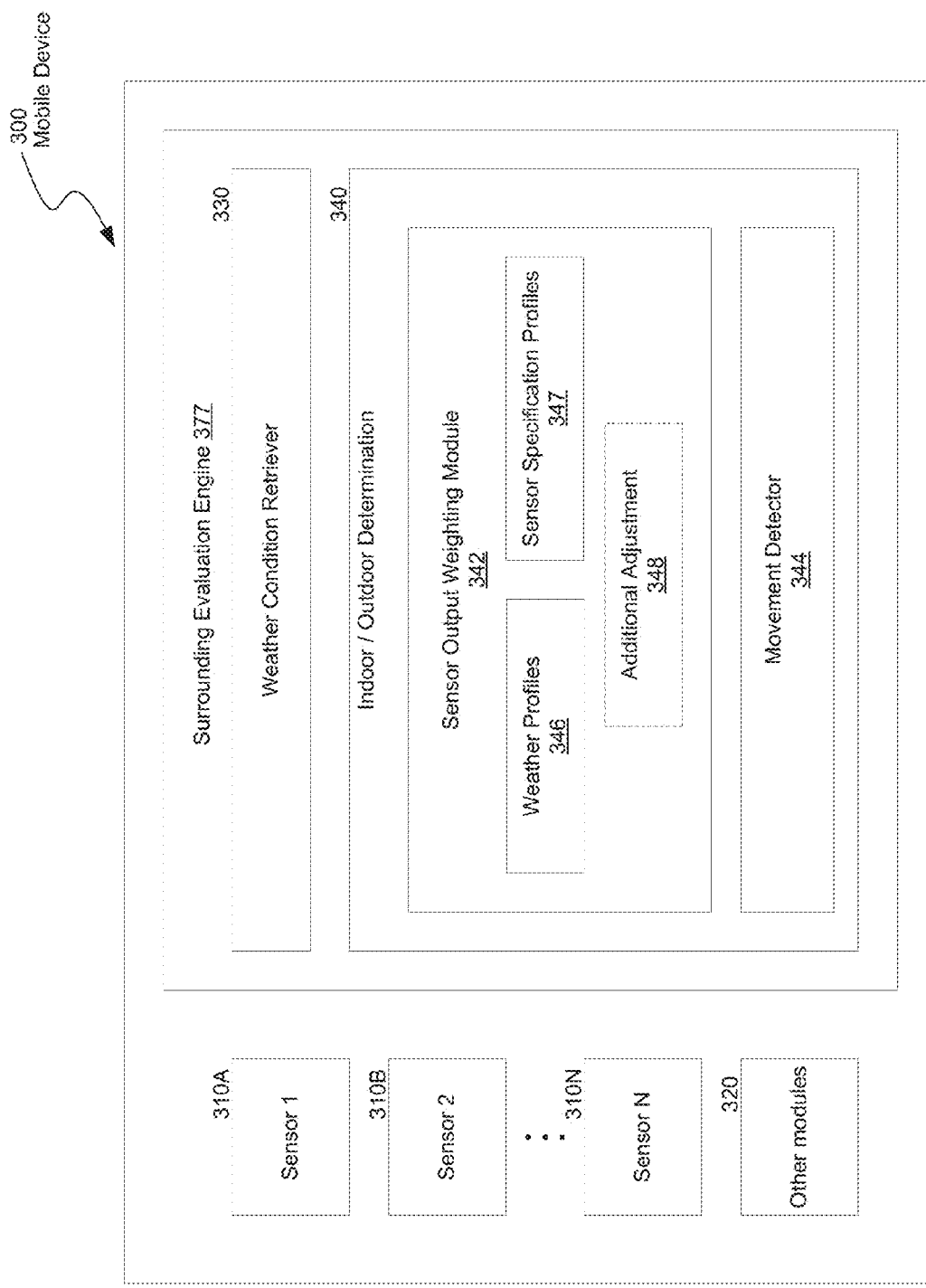
FIG. 3 depicts additional details of the surrounding estimation engine of FIG. 2 in accordance with some embodiments.

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure FIG. 3 depicts example functional components of a mobile device 300 implementing a surrounding evaluation engine 377, which is one embodiment of the surrounding evaluation engine 177 of FIG. 1A.

The mobile device 300 can include one or more sensors 310A-310N (hereinafter referred to as "the sensors 310"), other platform specific and/or other modules 320 such as network interface components, other hardware components, native applications, etc., other components described in FIG. 1E, and the like. The surrounding evaluation engine 377, in one embodiment, can include a weather condition retriever module 330, and an indoor/outdoor determination module 340. The indoor/outdoor determination module 340 can include sensor output weighting module 342 and a movement detector module 344. In some embodiments, the sensor output weighting module 342 can include weather profiles 346, sensor specification profiles 347, and an additional adjustment module 348. Additional or less modules or components can be included in the surrounding evaluation engine 377. Depending on the implementation, one or more of the components can be consolidated into a single component, and/or a single component can be further divided into multiple components.

According to some embodiments, the surrounding evaluation engine 377 can determine/detect the surrounding in which the mobile device 300 is situated (e.g., whether the mobile device 101 is indoor or outdoor) based on sensors on the mobile device 300. The sensors 310 can be typical sensors on the mobile device 300, which do not require additional infrastructure. Also, as used throughout herein, a sensor need not be a dedicated sensor; any suitable circuit or component that can be used as a sensor (e.g., WiFi, or GSM antennas) can be adapted to implement the disclosed techniques.

In some variations, the surrounding evaluation engine 377 first detects whether the mobile device is in motion, and the surrounding detection is only performed upon or after a location change of the mobile device 300. As aforementioned, this technique can increase the possibility that the detection generates meaningful results and avoid undesirable power drain. In these embodiments, before the surrounding evaluation engine 377 starts the surrounding evaluation (e.g., by the indoor/outdoor determination module 340), the surrounding evaluation engine 377 employs the movement detector 344 to detect whether the mobile device 300 is in motion. In some examples, the determining is only performed upon or after a location change of the mobile device exceeds a threshold. Additionally or alternatively, the timing of the determination can be adjusted based on the movement detection.

In some examples, the surrounding evaluation engine 377 only starts detection of the surroundings when the user has moved a number of steps within a given time period. The number of steps the user has traveled can be estimated by the movement detector 344 by the readings from an accelerometer. For example, the movement detector 344 can use an accelerometer to detect if a user of the mobile device has traveled a predetermined number of steps within a given time period.

Additionally or alternatively, coarse location update can be used to verify if the user is moving his or her location. In one or more embodiments, the movement detector 344 uses wireless network circuitry on the mobile device to estimate the mobile device is changing location. The wireless network circuitry can include a wireless telephony circuit and/or a wireless local area network (WLAN) circuit. In some embodiments, the surrounding evaluation engine 377 only start taking inputs from various sensors 310 and the above-said surrounding evaluation process once the movement detector 344 establishes that the user has moved the location.

Then, the indoor/outdoor determination module 340 uses the reading outputs from the sensors 310 and processes the outputs by the sensor output weighting module 342 to get the estimation of whether the mobile device 300 is indoor or outdoor. The weighting is based on the weather information. As such, during normal operations, the weather condition retriever 330 first retrieves a weather condition from a remote server (e.g., the weather server 119). The retrieval process can be either direct or indirect. In some embodiments, the weather condition retriever 330 can establish communication with the weather server 119 to receive/request weather condition. Additionally or alternatively, the weather condition retriever 330 can request/receive the weather condition from an intermediary source including, for example, another software application (e.g., a weather app) running on the mobile device 300 or a native source on the mobile device 300 (e.g., a weather service application programming interface (API) as provided by an operating system of the mobile device 300). The weather condition can include sunrise/sunset/or almanac timings for the whole day. In some embodiments, this can be done once a day. In variations, the information can include forecasted weather so that the disclosed techniques may still function when there is no Internet connections.

The indoor/outdoor determination module 340 derives (e.g., via the sensor output weighting module 342) a plurality of weights for the sensors 310 on the mobile device 300. This weight deriving process is performed based on the weather condition. Specifically, the sensor output weighting module 342 can derive the weights based on the weather profiles 346 and the sensor specification profiles 347. The weather profiles 346 can document, for example, for each kind of weather, whether and how each of the sensors 310 should take part in the indoor/outdoor determination algorithm. The sensor specification profiles 347 can document what kinds of sensors the mobile device 300 is equipped with, and each sensor's specification (e.g., manufacturer, batch, sensitivity, etc.). Both profiles 346 and 347 are considered, together with the retrieved weather information, by the sensor output weighting module.

Then, the indoor/outdoor determination module 340 applies each weight to an output of a corresponding sensor on the mobile device 300. That is to say, the above derived weightings and other information are applied by the indoor/outdoor determination module onto the sensor readings, and the indoor/outdoor determination module 340 determines whether the mobile device 300 is likely to be indoor or outdoor based on one or more weighted outputs from the sensors. The determination can be based on an indoor/outdoor detection algorithm that calculates the likelihood of the mobile device 300 being indoor or outdoor.

More specifically, according to one or more examples, the sensors 310 which can be used in determining the mobile device 300's surroundings include, by way of example and not limitation, GPS status sensors, light sensors, WLAN (or WiFi) sensors, accelerometers, gyroscopes, ambient temperature sensors, and/or battery sensors. Note that, in the following description, the likelihood of the surroundings is discussed with respect to readings from a sensor; however, according to the present disclosure, the determining can be based on more than one weighted outputs from the sensors 310 (e.g., determining the likelihood from a totality of sensor outputs).

In some embodiments, if the movement detector 344 has determined that the user of the mobile device has traveled a predetermined number of steps within a given time period, the indoor/outdoor determination module 340 uses readings from a global positioning satellite (GPS) receiver to determine how many satellites' signals can be received by the GPS receiver. Based on the readings, the indoor/outdoor determination module 340 evaluates that the mobile device is likely to be indoor if a number of satellites with receivable signals is below a threshold. In some of these examples, the GPS receiver is only turned on when it is determined that the user has walked significant number of steps. GPS signals are then registered to update the location. The number of satellites that are visible to the GPS receiver is also registered by the movement detector 344. In one or more examples, if the number of satellites visible is less than three, then the probability of the mobile device 300 being indoor is high.

Further, in some examples, the sensors 310 include a light sensor. The indoor/outdoor determination module 340 can statistically calculate a background light intensity from the light sensor. The statistical calculating is based on the plurality of weights derived based on the weather condition (by referring to weather profiles 346 and sensor specification profiles 347). Then, the indoor/outdoor determination module 340 evaluates that the mobile device 300 is likely to be indoor if the background light intensity is below a first number. In a similar fashion, the indoor/outdoor determination module 340 evaluates that the mobile device 300 is likely to be outdoor if the background light intensity is above a second number. For example, if the light intensity sensed by the light sensor is very high (e.g., in the range of 1500 lumens, after weighting adjustments), then the mobile device 300 is likely to be at outdoor. Likewise, if the light intensity sensed by the sensor is very low (e.g., in the range of 400~500 lumens, after weighting adjustments), then the mobile device 300 is likely to be at indoor.

In some examples, the sensors 310 include a ambient temperature sensor. The indoor/outdoor determination module 340 can statistically calculate a background temperature from the temperature sensor. The statistical calculating is based on the plurality of weights derived based on the weather condition. Then, the indoor/outdoor determination module 340 can evaluate that the mobile device 300 is likely to be indoor if the background temperature (after weighting adjustments) is above a first number. Similarly, the indoor/outdoor determination module 340 can evaluate that the mobile device is likely to be outdoor if the background temperature (after weighting adjustments) is below a second number. For example, if the weather outside is cold, then the indoor/outdoor determination module 340 can assume that the temperature indoors may be higher (e.g., if the mobile device 300 is located in a geographic area where heaters are extensively used). Conversely, if the weather outside is hot, then the indoor/outdoor determination module 340 can assume that the temperature indoors may be lower (e.g., if the mobile device 300 is located in a geographic area where air conditioners are extensively used). The indoor/outdoor determination module 340 can observe this rise or fall in temperature and use this input to determine the mobile device 300's surrounding. In some embodiments, the rate at which the temperature drops can be considered as well.

Moreover, in some embodiments, the sensors 310 comprise a proximity sensor, and the surrounding evaluation engine 377 uses the proximity sensor to detect whether the mobile device 300 is in condition (a): a pocket of a user; or condition (b): in close proximity to the user's body so as to affect the outputs from the sensors 310 (e.g., when the user is making a phone call by placing the mobile device 300 close to the user's face. In one or more implementations, if the mobile device 300 is in (a) or (b) condition, the surrounding evaluation engine 377 excludes outputs from a light sensor and a temperature sensor from the determining process.

In some embodiments, the sensors 310 comprise a wireless local area network (WLAN) circuit, and the indoor/outdoor determination module 340 measures a received signal strength indication (RSSI) number using the WLAN circuit. If the RSSI number is above a first number, the indoor/outdoor determination module 340 evaluates that the mobile device 300 is likely to be indoor. If the RSSI number is below a second number, the indoor/outdoor determination module 340 evaluates that the mobile device 300 is likely to be outdoor. For example, if the measured signal strength is less that −78 dB, then the mobile device 300 is more likely to be at outdoor as compared to indoor. Conversely, if the measured signal strength is more than −74 dB, then the mobile device 300 is more likely to be at indoor as compared to outdoor.

In some embodiments, the sensors 310 comprise a battery status sensor to retrieve a charging state of a battery of the mobile device 300. The indoor/outdoor determination module 340 can adjust the plurality of weights based on the charging state. That is to say, the indoor/outdoor determination module 340 can use the battery sensor to retrieve the current charging state of the device and assign different weights to the sensor readings for detection algorithm based on the retrieved state. For example, in some embodiments, the indoor/outdoor determination module 340 can decrease a background temperature as being statistically calculated from a temperature sensor so as to compensate for a temperature increase caused by the mobile device's battery being charged or discharged.

As an optional feature, the additional adjustment module 348 can learn from past or historical surrounding estimation, and can adjust the profiles 346 and 347 so that the accuracy of future surrounding estimation can be increased. In one example, the additional adjustment module 348 can prompt the user to correct or verify the estimation during a training period.

In this way, among other benefits, the surrounding evaluation techniques disclosed herein increase accuracy to estimate the mobile device's surrounding (e.g., whether indoor or outdoor) without the need of dedicated sensors or other modification to mobile network infrastructures, thereby providing the benefit of surrounding sensing without incurring the cost.

Figure 4:
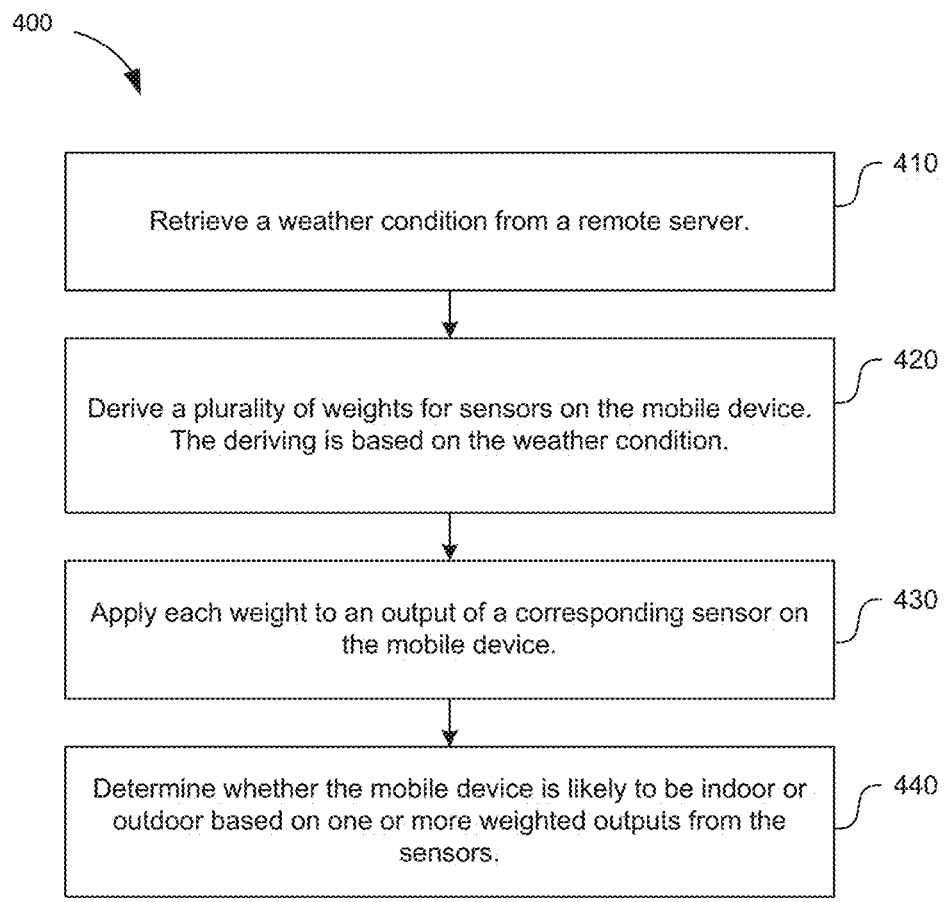
FIG. 4 depicts an example flow diagram illustrating a method of estimating a surrounding by using sensors on a mobile device.

FIG. 4 depicts an example flow diagram illustrating a method 400 of estimating a surrounding by using sensors on a mobile device. The method 400 can be implemented on, for example, a user mobile device (e.g., device 101, FIG. 1A; device 150, FIG. 1B; device 250, FIG. 2; device 300, FIG. 3). With general reference to FIGS. 1A-1B and 2-3, the method 400 is now described.

As previously discussed, the surrounding evaluation engine 377 can determine/detect the surrounding in which the mobile device 300 is situated (e.g., whether the mobile device 101 is indoor or outdoor) based on sensors on the mobile device 300. The sensors 310 can be typical sensors on the mobile device 300, which do not require additional infrastructure. Also, as used throughout herein, a sensor need not be a dedicated sensor; any suitable circuit or component that can be used as a sensor (e.g., WiFi, or GSM antennas) can be adapted to implement the disclosed techniques.

The indoor/outdoor determination module 340 uses the reading outputs from the sensors 310 and processes the outputs by the sensor output weighting module 342 to get the estimation of whether the mobile device 300 is indoor or outdoor. The weighting is based on the weather information. As such, during normal operations, the weather condition retriever 330 first retrieves (410) a weather condition from a remote server (e.g., the weather server 119). The weather condition can include sunrise/sunset/or almanac timings for the whole day. In some embodiments, this can be done once a day. In variations, the information can include forecasted weather so that the disclosed techniques may still function when there is no Internet connections.

The indoor/outdoor determination module 340 derives (420) (e.g., via the sensor output weighting module 342) a plurality of weights for the sensors 310 on the mobile device 300. This weight deriving process is performed based on the weather condition. Specifically, the sensor output weighting module 342 can derive the weights based on the weather profiles 346 and the sensor specification profiles 347. The weather profiles 346 can document, for example, for each kind of weather, whether and how each of the sensors 310 should take part in the indoor/outdoor determination algorithm. The sensor specification profiles 347 can document what kinds of sensors the mobile device 300 is equipped with, and each sensor's specification (e.g., manufacturer, batch, sensitivity, etc.). Both profiles 346 and 347 are considered, together with the retrieved weather information, by the sensor output weighting module.

Then, the indoor/outdoor determination module 340 applies (430) each weight to an output of a corresponding sensor on the mobile device 300. That is to say, the above derived weightings and other information are applied by the indoor/outdoor determination module onto the sensor readings, and the indoor/outdoor determination module 340 determines (440) whether the mobile device 300 is likely to be indoor or outdoor based on one or more weighted outputs from the sensors. The determination can be based on an indoor/outdoor detection algorithm that calculates the likelihood of the mobile device 300 being indoor or outdoor.

Figure 5:
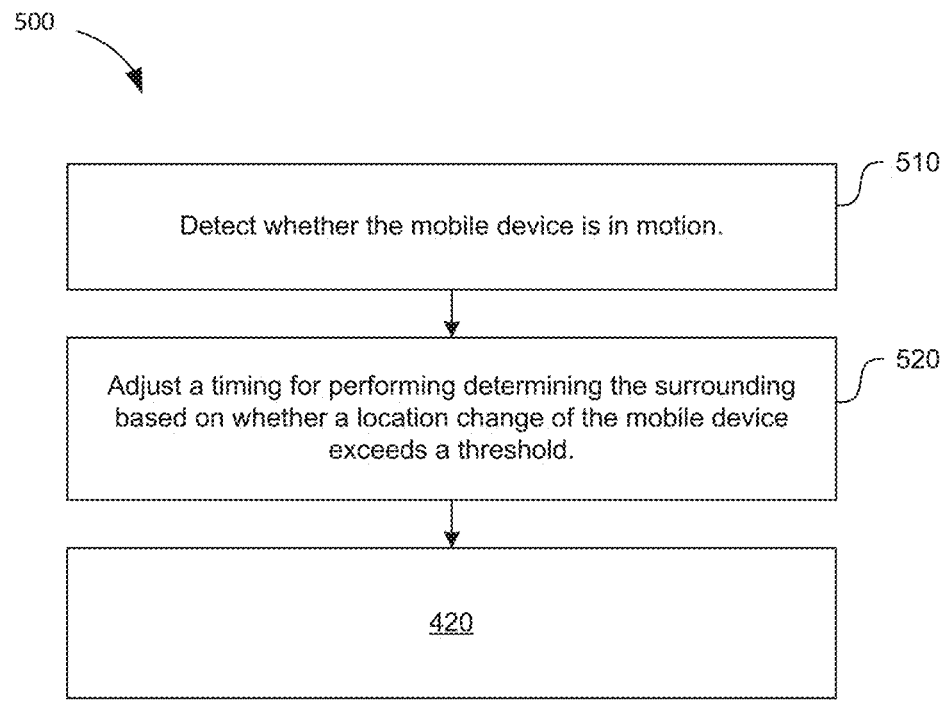
FIG. 5 depicts some additional details of the method of FIG. 4 in accordance with some embodiments.

FIG. 5 depicts some additional details of the method of FIG. 4 in accordance with some embodiments In some variations, the surrounding evaluation engine 377 first detects (510) whether the mobile device is in motion, and the surrounding detection is only performed upon or after a location change of the mobile device 300. As aforementioned, this technique can increase the possibility that the detection generates meaningful results and avoid undesirable power drain. In these embodiments, before the surrounding evaluation engine 377 starts the surrounding evaluation (e.g., by the indoor/outdoor determination module 340), the surrounding evaluation engine 377 employs the movement detector 344 to detect whether the mobile device 300 is in motion. In some examples, the determining is only performed upon or after a location change of the mobile device exceeds a threshold.

Additionally or alternatively, the timing of the determination can be adjusted (520) based on the movement detection. In some examples, the surrounding evaluation engine 377 only starts detection of the surroundings when the user has moved a number of steps within a given time period. The number of steps the user has travelled can be estimated by the movement detector 344 by the readings from an accelerometer. For example, the movement detector 344 can use an accelerometer to detect if a user of the mobile device has traveled a predetermined number of steps within a given time period.

Figure 6:
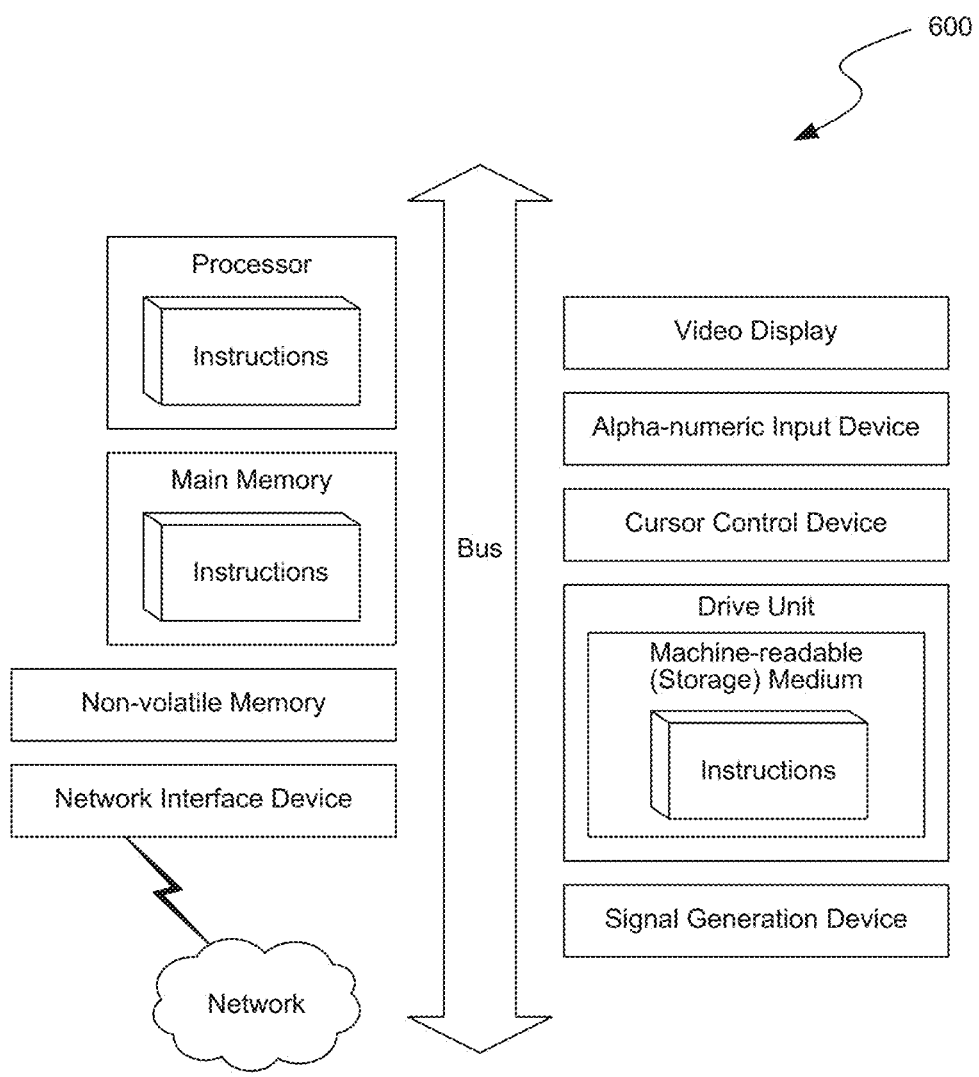
FIG. 6 depicts a diagrammatic representation of a machine in the example form of a computer system within which a set of instructions, for causing the machine to perform any one or more of the methodologies discussed herein, may be executed.

FIG. 6 shows a diagrammatic representation of a machine in the example form of a computer system within which a set of instructions, for causing the machine to perform any one or more of the methodologies discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIG. 2 (and any other components described in this specification) can be implemented. The computer system 600 can be of any applicable known or convenient type. The components of the computer system 600 can be coupled together via a bus or through some other known or convenient device.

The processor may be, for example, a conventional microprocessor such as a microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

What is claimed is:

1. A method for sensing a surrounding of a mobile device, the method comprising:
   requesting a weather condition that is received from a remote server;
   deriving, based on the weather condition, a plurality of weights for sensors on the mobile device;
   applying each weight to an output of a corresponding sensor on the mobile device;
   determining whether the mobile device is likely to be indoor or outdoor based on one or more weighted outputs from the sensors;
   detecting whether the mobile device is in motion by a method comprising using an accelerometer to detect if a user of the mobile device has traveled a predetermined number of steps within a given time period;
   adjusting a timing for determining whether the mobile device is indoor or outdoor based on whether a location change of the mobile device exceeds a threshold; and
   if the user of the mobile device has traveled a predetermined number of steps within a given time period, using a global positioning satellite (GPS) receiver to determine how many satellites' signals can be received by the GPS receiver; and determining that the mobile device is likely to be indoor if a number of satellites with receivable signals is below a threshold.

2. The method of claim 1, wherein determining whether the mobile device is indoor or outdoor is based on more than one weighted outputs from the sensors.

3. The method of claim 1, wherein detecting whether the mobile device is in motion comprises: using wireless network circuitry on the mobile device to estimate the mobile device is changing location.

4. The method of claim 3, wherein the wireless network circuitry comprises a wireless telephony circuit and a wireless local area network (WLAN) circuit.

5. The method of claim 1, wherein the sensors comprise a light sensor, and wherein the determining further comprises: statistically calculating a background light intensity from the light sensor, wherein the statistical calculating is based on the plurality of weights derived based on the weather condition; determining that the mobile device is likely to be indoor if the background light intensity is below a first number; and determining that the mobile device is likely to be outdoor if the background light intensity is above a second number.

6. The method of claim 1, wherein the sensors comprise a temperature sensor, and wherein determining whether the mobile device is likely to be indoor or outdoor further comprises: statistically calculating a background temperature from the temperature sensor, wherein the statistical calculating is based on the plurality of weights derived based on the weather condition; determining that the mobile device is likely to be indoor if the background temperature is above a first number; and determining that the mobile device is likely to be outdoor if the background temperature is below a second number.

7. The method of claim 1, wherein the sensors comprise a wireless local area network (WLAN) circuit, and wherein the determining further comprises: measuring a received signal strength indication (RSSI) number using the WLAN circuit; determining that the mobile device is likely to be indoor if the RSSI number is above a first number; and determining that the mobile device is likely to be outdoor if the RSSI number is below a second number.

8. A mobile device that senses its surrounding, the mobile device comprising:
a processor; and
a memory coupled to the processor and storing instructions thereon which, when executed by the processor, cause the processor to perform steps comprising:
requesting a weather condition that is received from a remote server;
deriving, based on the weather condition, a plurality of weights for sensors on the mobile device;
applying each weight to an output of a corresponding sensor on the mobile device;
determining whether the mobile device is likely to be indoor or outdoor based on one or more weighted outputs from the sensors;
detecting whether the mobile device is in motion, wherein the detecting comprises using an accelerometer to detect if a user of the mobile device has traveled a predetermined number of steps within a given time period; and
adjusting a timing for performing the determining is adjusted based on whether a location change of the mobile device exceeds a threshold;
wherein the processor is further caused to perform steps comprising: if the user of the mobile device has traveled a predetermined number of steps within a given time period, using a global positioning satellite (GPS) receiver to determine how many satellites' signals can be received by the GPS receiver; and determining that the mobile device is likely to be indoor if a number of satellites with receivable signals is below a threshold.

9. The device of claim 8, wherein the determining is based on more than one weighted outputs from the sensors.

10. The device of claim 8, wherein the processor is further caused to perform steps comprising, in performing the detecting: using wireless network circuitry on the mobile device to estimate the mobile device is changing location.

11. The device of claim 10, wherein the wireless network circuitry comprises a wireless telephony circuit and a wireless local area network (WLAN) circuit.

12. The device of claim 8, wherein the sensors comprise a light sensor, and wherein the processor is further caused to perform steps comprising, in performing the determining: statistically calculating a background light intensity from the light sensor, wherein the statistical calculating is based on the plurality of weights derived based on the weather condition; evaluating that the mobile device is likely to be indoor if the background light intensity is below a first number; and evaluating that the mobile device is likely to be outdoor if the background light intensity is above a second number.

13. The device of claim 8, wherein the sensors comprise a temperature sensor, and wherein the processor is further caused to perform steps comprising, in performing the determining: statistically calculating a background temperature from the temperature sensor, wherein the statistical calculating is based on the plurality of weights derived based on the weather condition; evaluating that the mobile device is likely to be indoor if the background temperature is above a first number; and evaluating that the mobile device is likely to be outdoor if the background temperature is below a second number.

14. The device of claim 8, wherein the sensors comprise a wireless local area network (WLAN) circuit, and wherein the processor is further caused to perform steps comprising, in performing the determining: measuring a received signal strength indication (RSSI) number using the WLAN circuit; evaluating that the mobile device is likely to be indoor if the RSSI number is above a first number; and evaluating that the mobile device is likely to be outdoor if the RSSI number is below a second number.

15. A method for sensing a surrounding of a mobile device, the method comprising:
requesting a weather condition that is received from a remote server;
deriving, based on the weather condition, a plurality of weights for sensors on the mobile device;
applying each weight to an output of a corresponding sensor on the mobile device;
determining whether the mobile device is likely to be indoor or outdoor based on one or more weighted outputs from the sensors;
wherein the sensors comprise a proximity sensor, the method further comprising: using the proximity sensor to detect whether the mobile device is in condition: (a) a pocket of a user or (b) in close proximity to the user's body so as to affect the outputs from the sensors; and if the mobile device is in (a) or (b) condition, excluding outputs from a light sensor and a temperature sensor from the determining process.

16. A method for sensing a surrounding of a mobile device, the method comprising:
requesting a weather condition that is received from a remote server;
deriving, based on the weather condition, a plurality of weights for sensors on the mobile device;
applying each weight to an output of a corresponding sensor on the mobile device;
determining whether the mobile device is likely to be indoor or outdoor based on one or more weighted outputs from the sensors;
wherein the sensors comprise a battery status sensor to retrieve a charging state of a battery of the mobile device, and wherein the method further comprises: adjusting the plurality of weights based on the charging state.

17. The method of claim 16, wherein the adjusting of the plurality of weights comprises: decreasing a background temperature as being statistically calculated from a temperature sensor so as to compensate for a temperature increase caused by the mobile device's battery being charged or discharged.

18. A mobile device that senses its surrounding, the mobile device comprising:
a processor; and
a memory coupled to the processor and storing instructions thereon which, when executed by the processor, cause the processor to perform steps comprising:

requesting a weather condition that is received from a remote server;

deriving, based on the weather condition, a plurality of weights for sensors on the mobile device;

applying each weight to an output of a corresponding sensor on the mobile device; and determining whether the mobile device is likely to be indoor or outdoor based on one or more weighted outputs from the sensors, wherein the sensors comprise a proximity sensor, and wherein the processor is further caused to perform steps comprising: using the proximity sensor to detect whether the mobile device is in condition: (a) a pocket of a user or (b) in close proximity to the user's body so as to affect the outputs from the sensors; and if the mobile device is in (a) or (b) condition, excluding outputs from a light sensor and a temperature sensor from the determining process.

19. A mobile device that senses its surrounding, the mobile device comprising:

a processor; and a memory coupled to the processor and storing instructions thereon which, when executed by the processor, cause the processor to perform steps comprising:

requesting a weather condition that is received from a remote server;

deriving, based on the weather condition, a plurality of weights for sensors on the mobile device;

applying each weight to an output of a corresponding sensor on the mobile device; and determining whether the mobile device is likely to be indoor or outdoor based on one or more weighted outputs from the sensors;

wherein the sensors comprise a battery status sensor to retrieve a charging state of a battery of the mobile device, and wherein the processor is further caused to perform steps comprising: adjusting the plurality of weights based on the charging state.

20. The device of claim 19, wherein the processor is further caused to perform steps comprising, in performing the adjusting of the plurality of weights: decreasing a background temperature as being statistically calculated from a temperature sensor so as to compensate for a temperature increase caused by the mobile device's battery being charged or discharged.

\* \* \* \* \*